United States Patent
Nakashima et al.

(10) Patent No.: US 12,442,307 B2
(45) Date of Patent: Oct. 14, 2025

(54) STEAM TURBINE MEMBER

(71) Applicant: FUJI ELECTRIC CO., LTD., Kawasaki (JP)

(72) Inventors: Yuya Nakashima, Hachioji (JP); Masato Hirota, Yokohama (JP); Naoya Yoshimi, Tokyo (JP)

(73) Assignee: FUJI ELECTRIC CO., LTD., Kawasaki (JP)

( * ) Notice: Subject to any disclaimer, the term of this patent is extended or adjusted under 35 U.S.C. 154(b) by 0 days.

(21) Appl. No.: 17/972,736

(22) Filed: Oct. 25, 2022

(65) Prior Publication Data

US 2023/0044725 A1 Feb. 9, 2023

Related U.S. Application Data

(63) Continuation of application No. PCT/JP2021/036593, filed on Oct. 4, 2021.

(30) Foreign Application Priority Data

Nov. 19, 2020 (JP) .................. 2020-192605

(51) Int. Cl.
*F01D 5/28* (2006.01)
*F01D 9/02* (2006.01)

(52) U.S. Cl.
CPC ............. *F01D 5/288* (2013.01); *F01D 9/02* (2013.01); *F05D 2220/31* (2013.01); *F05D 2300/506* (2013.01); *F05D 2300/516* (2013.01); *F05D 2300/604* (2013.01); *F05D 2300/611* (2013.01)

(58) Field of Classification Search
CPC ......... F01D 9/02; F01D 5/288; F05D 2230/31
See application file for complete search history.

(56) References Cited

U.S. PATENT DOCUMENTS

| | | | |
|---|---|---|---|
| 6,099,976 A | 8/2000 | Lemelson et al. | |
| 10,906,270 B2 * | 2/2021 | Konno | F04C 15/00 |
| 2003/0165382 A1 | 9/2003 | Suzuki et al. | |
| 2005/0025617 A1 | 2/2005 | Suzuki et al. | |
| 2007/0224037 A1 | 9/2007 | Suzuki et al. | |
| 2010/0304181 A1 * | 12/2010 | Anand | C23C 28/324 |
| | | | 428/323 |
| 2019/0143644 A1 | 5/2019 | Konno et al. | |

FOREIGN PATENT DOCUMENTS

| | | | | |
|---|---|---|---|---|
| EP | 2154265 A1 | 2/2010 | | |
| JP | 2003-214113 A | 7/2003 | | |
| JP | 2007162613 A | * 6/2007 | ........... | C23C 28/046 |
| JP | 2010-156286 A | 7/2010 | | |
| JP | 2017-160842 A | 9/2017 | | |

(Continued)

OTHER PUBLICATIONS

Icelandic Office Action dated Feb. 27, 2023 for counterpart Icelandic Patent Application No. IS050382.

(Continued)

*Primary Examiner* — Sabbir Hasan

(57) ABSTRACT

A steam turbine member has suppressed adhesion of scale for a long time without deterioration of corrosion resistance and the like of a turbine. A steam turbine member includes a hard layer 2 and a deposited amorphous carbon film 3 on a base material 1, in that order.

7 Claims, 1 Drawing Sheet

(56) References Cited

FOREIGN PATENT DOCUMENTS

JP  2018-31334 A  3/2018
JP  2019-7059 A  1/2019

OTHER PUBLICATIONS

International Search Report, dated Nov. 22, 2021, in International Application No. PCT/JP2021/036593 (2 pp.).
Written Opinion of the International Searching Authority, dated Nov. 22, 2021, in International Application No. PCT/JP2021/036593 (4 pp.).
Japanese Office Action dated Jan. 5, 2024 for corresponding Japanese Application No. 2022-563614.

* cited by examiner

STEAM TURBINE MEMBER

CROSS REFERENCE TO RELATED APPLICATIONS

This application is a Continuation of International Patent Application No. PCT/JP2021/036593 filed on Oct. 4, 2021, which claims priority benefit from Japanese Patent Application No. 2020-192605 filed on Nov. 19, 2020, the contents of each of which are incorporated herein by reference.

TECHNICAL FIELD

The present invention relates to a steam turbine member. In particular, the present invention relates to a highly durable steam turbine in which adhesion of scale is suppressed.

BACKGROUND ART

To generate power, a steam turbine used in geothermal power generation converts thermal energy in high-temperature and high-pressure geothermal steam into rotational force via a turbine blade. In this case, the steam, having lost energy, is reduced in temperature and pressure. When the temperature and the pressure of the high-temperature and high-pressure geothermal steam are reduced, silica, calcium, iron sulfide, and the like, dissolved in the steam, precipitate and are deposited on a surface of a turbine blade. As deposition progresses, a passage through which the geothermal steam flows may become clogged. This is called scale deposition. Scale deposition can be a cause of unexpected power station shutdown, reduces the utilization factor of the geothermal power station, and greatly reduces power generation of the geothermal power plant. Therefore, scale deposition is regarded as a problem to be solved.

It is known that scale deposition rate decreases in accordance with the pH of geothermal steam, and scale deposition can be suppressed to some extent by lowering the pH to not greater than 5. As a specific method for realizing this, sulfuric acid, hydrochloric acid, or the like is injected into a geothermal fluid. Silica, one of the principal constituents of scale, can be reduced in rate of deposition by reducing the pH. Similarly, calcium precipitates in the form of calcium carbonate or the like, and such a calcium salt dissolves at a low pH, and hence, scale containing calcium can thus be reduced. Reducing the pH of the geothermal steam may, however, increase risk of corrosion damage to an iron-based material contained in the turbine.

Alternatively, there is known a technique in which effects on power reduction due to scale deposited on a surface of a blade may be suppressed by forming a nozzle vane and forming a throat width on an inlet side of the turbine to be larger than conventionally (Patent Document 1).

There is a known technique in which scale adhesion is suppressed by spraying a solution containing an organic material having a carboxyl group into geothermal steam (Patent Document 2). In this technique, the problem of corrosion resistance is avoided because no acid is injected.

CITATION LIST

Patent Document

[Patent Document 1]: JP 2003-214113 A
[Patent Document 2]: JP 2017-160842 A

SUMMARY OF INVENTION

Technical Problem

The technique of Patent Document 1, however, cannot fundamentally suppress adhesion of scale. Furthermore, the technique of Patent Document 2 has a problem of reducing efficiency of power generation due to decrease in temperature of the steam and increase in the water vapor in the steam caused by spraying of the solution on the steam. The technique of Patent Document 2 also has the problem of increased cost because the solution containing an organic material must be continuously introduced thereinto. Furthermore, these organic materials have a heat resistant temperature of not greater than 200° C., and thus in power plants in which geothermal steam at a high temperature of about 200° C. is used, the organic material may be thermally decomposed and the expected effect of suppressing adhesion of scale may not be obtained.

To solve the above-mentioned problem, a steam turbine member which has excellent durability and can suppress scale deposition at high temperature and high pressure for a long time without the risk of damage to members constituting the turbine or without restriction on operational conditions, and a steam turbine comprising the same, are desired.

Solution to Problem

An embodiment of the present invention relates to a steam turbine member comprising a hard layer and a deposited amorphous carbon film on a base material, in that order.

It is preferable that, in the steam turbine member, the hard layer have a hardness of not less than 1,000 Hv.

It is preferable that, in the steam turbine member, the hard layer comprise a single layer or a plurality of layers comprising one or more inorganic compounds selected from SiC, WC, TiC, $SiO_2$, $Al_2O_3$, TiN, ZrN, CrN, TiCN, TiAlN, TiCrN, $ZrO_2$ and CoNiCrAlY.

It is preferable that, in the steam turbine member, the hard layer have a thickness of 1 μm to 500 μm.

It is preferable that, in the steam turbine member, the deposited carbon film have a relative intensity ratio (Id/Ig) between an intensity at a D band and an intensity at a G band in a Raman spectrum of 0 to 1.5.

It is preferable that, in the steam turbine member, the deposited carbon film have a thickness of 100 nm to 8 μm.

It is preferable that, in the steam turbine member, the deposited carbon film have a maximum height roughness Rz of not greater than 6.3 μm.

It is preferable that the steam turbine member be a first-stage stationary blade.

Another embodiment of the present invention relates to a steam turbine comprising the steam turbine member according to any of the above-mentioned.

Advantageous Effect of Invention

The present invention provides a highly durable steam turbine member in which the amount of adhesion of scale can be reduced to not greater than ¼ and to a minimum of about 1/50 compared to in the prior art and in which the effect of suppressing adhesion of scale is maintained for a long time, a method for producing the same, and a steam turbine comprising the steam turbine member.

DESCRIPTION OF EMBODIMENTS

In the following, embodiments of the present invention will be described referring to the Figures. However, the present invention is not limited to the embodiments described below.

Figure 1:
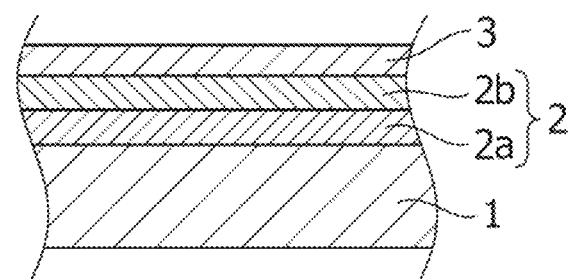
FIG. 1 is a schematic view illustrating the structure of a steam turbine member according to an embodiment of the present invention.

An embodiment of the present invention relates to a steam turbine member including a hard layer and a deposited amorphous carbon film on a base material, in that order. The structure of the steam turbine member of the present embodiment will be described with reference to FIG. 1. FIG. 1 is a schematic partial cross-sectional view of a steam turbine member according to the present embodiment. Referring to FIG. 1, the steam turbine member includes a base material 1, a hard layer 2, and a deposited carbon film 3. FIG. 1 is a schematic view and the ratio of the thickness of the layers shown in FIG. 1 does not limit the present invention.

In the present invention, the steam turbine member refers to a member constituting a steam turbine, and includes, but is not limited to, a steam turbine stationary blade, a steam turbine rotor blade, a steam turbine rotor, a bearing, a casing, a seal part (a seal fin) of the casing, a seal part for preventing steam leakage, and a main steam valve. In particular, the steam turbine member refers to a steam turbine member for geothermal power, which comes into contact with geothermal steam and may have the problem of scale deposition due to calcium, silica, and iron sulfide, but the member is not particularly limited.

The base material 1 constituting the steam turbine member may usually be of metal, and it may be stainless steel having corrosion resistance, heat resistance, and wear resistance, and which is usually used for steam turbines. Examples of base materials 1 include carbon steel, low alloy steel, martensite stainless steel, austenite stainless steel and ferrite stainless steel, depending on the type of the member described above and the position in the steam turbine. Furthermore, examples of base materials for a stationary blade of a steam turbine include 13% Cr steel, and examples of base materials for a seal fin include 17% Cr steel such as SUS410, but the base material is not limited thereto. It is preferable that the surface of the base material on which a hard layer is formed be mirror polished.

A hard layer 2 is formed on the base material 1 in contact with the base material 1. The hard layer 2 has a Vickers hardness of not less than 1,000 Hv. The upper limit of Vickers hardness is not particularly limited, but the hard layer 2 may have a Vickers hardness of not less than about 1,000 Hv and not greater than about 3,000 Hv. In the present description, the hardness of the hard layer is defined by Vickers hardness, but when the hardness is measured by other hardness tests such as the Rockwell hardness test, the Brinell hardness test, and the Knoop hardness test, and when the measured value is converted into Vickers hardness, a layer having a hardness equivalent thereto can be regarded as the hard layer 2 of the present invention.

Examples of layers having a Vickers hardness of not less than about 1,000 Hv include a layer made of a ceramic material. Examples of ceramic materials include one or more inorganic compounds selected from SiC, WC, TiC, $SiO_2$, $Al_2O_3$, TiN, ZrN, CrN, TiCN, TiAlN, TiCrN, $ZrO_2$ and CoNiCrAlY, but the ceramic material is not limited thereto.

Although the hard layer 2 may have a uniform thickness over the entire member, or may have different thicknesses in different portions, the hard layer 2 has a thickness of preferably not less than about 1 μm, and for example, more preferably, not less than about 1 μm and not greater than about 500 μm. The thickness of the hard layer 2 may vary depending on the material constituting the hard layer 2, and the hard layer 2 may have a thickness that can achieve the preferred hardness. For example, for CrN and TiAlN, the hard layer may have a thickness of about 2 to 8 μm, and for WC, the hard layer may have a thickness of about 200 to 400 μm. Steam to be introduced into a steam turbine includes solids such as sand grains, microdroplets, and debris derived from scale or corrosion products on the inner surfaces of pipes. The solids may collide with steam turbine members to create recesses, sometimes causing wear. It is preferable that the hard layer 2 have such a thickness that it can prevent the formation of recesses due to collision of solids described above. When the hard layer 2 is too thick, the layer may peel off.

The hard layer 2 may be a single layer, or it may be composed of two or more layers 2a and 2b, for example, three, four, or five layers. When the hard layer 2 is composed of two or more layers 2a and 2b, it is preferable that the layers be stacked in such an order that the layer near the base material 1 has lower hardness and the layer near the deposited carbon film 3 has higher hardness. A structure in which hardness is gradually increased from the base material 1 to the deposited carbon film 3 has the advantage that the hard layer 2 and the deposited carbon film 3 are unlikely to peel off. When the hard layer has a plurality of layers, it is preferable that the sum of the thicknesses of the layers be not less than about 1 μm and not greater than about 500 μm.

Next, the deposited amorphous carbon film 3 will be described in detail. The deposited carbon film 3 is in contact with the hard layer 2 and is stacked on the hard layer 2 on the side opposite from the base material 1. The deposited amorphous carbon film 3 is composed mainly of amorphous carbon and is produced by a vapor deposition method. In the present invention, being composed mainly of carbon means that not less than 50% of carbon is included based on the total mass. The deposited amorphous carbon film 3 may typically be a diamond-like carbon (DLC) film, and it may be a chemical vapor deposited film or a physical vapor deposited film. The deposited amorphous carbon film 3 has a relative intensity ratio (Id/Ig) between an intensity at a D band (near 1360 cm$^{-1}$) and an intensity at a G band (near 1580 cm$^{-1}$) in a Raman spectrum of preferably 0 to 1.5 and more preferably about 0.3 to 1.0. In particular, when the deposited amorphous carbon film 3 is a chemical vapor deposited film, the film has an Id/Ig of preferably 0.0 to 1.0, and when the deposited amorphous carbon film 3 is a physical vapor deposited film, the film has an Id/Ig of preferably 0.0 to 1.2. Id/Ig is corelated with the ratio between the Sp2 structure and the Sp3 structure in the deposited amorphous carbon film 3. In the present invention, an Id/Ig of the values is particularly effective for preventing scale deposition.

The deposited carbon film 3 may be substantially made only of carbon. Even in such a case, other elements may be inevitably mixed in during production. The deposited carbon film 3 composed only of carbon has the advantage of significantly suppressing scale deposition and having higher hardness and higher wear resistance than in steam turbines without such a film.

The deposited carbon film 3 may include hydrogen and/or nitrogen. Regardless of including hydrogen and/or nitrogen, the deposited carbon film 3 according to the present invention may include a small amount of oxygen due to the method of production. Furthermore, a compound constituting the hard layer 2 may be mixed in the deposited carbon film 3, and thus, the deposited carbon film 3 may include nonmetallic elements such as silicon (Si).

In the deposited amorphous carbon film 3, the number of dangling bonds is preferably not greater than $1.0 \times 10^{21}/cm^3$, and more preferably is not greater than $1.0 \times 10^{19}/cm^3$. The number of dangling bonds may be measured by electron spin resonance (ESR). More specifically, a deposited carbon film, which is to be stacked on the base material 1 and the hard layer 2 in the present invention, is formed on a non-conductive substrate such as silicon wafer by the same method, and the number of dangling bonds may be measured by electron spin resonance.

A dangling bond is a defect occurring when the deposited carbon film 3 is formed. Carbon has four bonds and usually becomes stable when it forms four covalent bonds with adjacent elements. However, since the deposited carbon film 3 is amorphous, no covalent bond may be formed and a bond (an unpaired electron) may be left, and this bond not involved in bonding is called a dangling bond. While not intended to be bound by theory, dangling bonds have significantly high energy and are easily bonded to atoms in proximity thereto, and this may be a cause of adhesion of silica scale. However, adjusting the number of dangling bonds to the range makes it possible to efficiently suppress adhesion of silica scale.

The deposited carbon film 3 may have a uniform thickness over the entire member, or it may have a different thicknesses in different portions. The deposited carbon film 3 has a thickness of preferably 100 nm to 8 μm, and more preferably 1 to 6 μm, although the thickness is not limited thereto.

Since the deposited amorphous carbon film 3 has a relatively smooth surface, the surface roughness of the deposited carbon film 3 also varies depending on the roughness of the hard layer 2 and base material 1 which are underlayers of the deposited carbon film. Thus, a desired surface roughness may be achieved by selecting materials of the hard layer 2 and the base material 1, or the degree of polishing of their surface. In an embodiment, it is preferred that for the surface roughness of the deposited amorphous carbon film 3, the deposited amorphous carbon film 3 has a maximum height roughness Rz of not greater than 6.3 μm. The maximum height roughness Rz refers to a value measured by a stylus profilometer.

A thin film layer made of Si may be included between the hard layer 2 and the deposited carbon film 3 as an optional element. The thin film layer made of Si may be formed in order to improve adhesiveness between the hard layer 2 and the deposited carbon film 3, and may have a thickness of about 0.1 to 10 nm.

The hard layer 2 and the deposited carbon film 3 may be provided on the entire surface of the base material 1 of the steam turbine member, or it may be provided on part of the base material 1. Typically, the layers may be provided on some portion of the base material 1 to which scale easily adheres. The portion of the base material 1 to which scale easily adheres is known in the art, although it varies depending on the type of steam turbine member. For example, when the steam turbine member is a steam turbine stationary blade, in particular a first-stage stationary blade, scale easily adheres to portions of the base material 1 extending from the top to the edge of the back of a profile, and thus, it is preferable to provide the hard layer 2 and the deposited carbon film 3 on at least that portion. Alternatively, when the steam turbine member is a seal fin, scale easily adheres to the surface of the seal fin.

Figure 2:
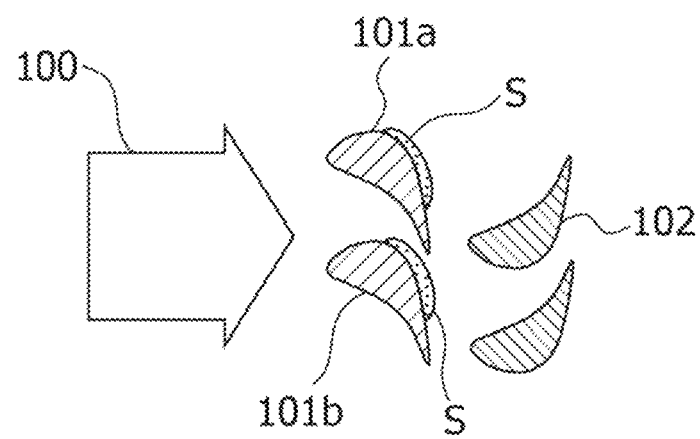
FIG. 2 is a schematic view illustrating scale deposition that occurs on first-stage stationary blades of a conventional steam turbine.

The first-stage stationary blade will be described in detail as an example of steam turbine members in which adhesion of scale must be suppressed, with reference to the figures. FIG. 2 is a schematic view illustrating scale deposition in the first-stage stationary blade of a conventional steam turbine. One out of seven to one out of ten or more stationary blades present, first-stage stationary blades 101a, 101b are fixed to a casing (not shown) at a portion closest to the inlet of geothermal steam 100 and forms rows of blades in a steam turbine. Rotor blades 102 are also provided close to the stationary blades. Geothermal steam 100 collides with the stationary blades 101a, 101b in the direction shown by the arrow in FIG. 1, and it then flows through the space between the adjacent stationary blades 101a, 101b. At that stage, silica and calcium dissolved in geothermal steam adhere to the portion from the top to the edge of a profile on the surface of the blade, in which the flow rate of the geothermal steam is the lowest and are deposited thereon in the form of scale S. In addition, compared to the first-stage stationary blades 101a, 101b, scale deposition is less likely to occur at the rotor blade 102 which is located in the downstream of the direction of travel of geothermal steam relative to the stationary blades 101a, 101b. Scale S adhering to the first-stage stationary blades 101a, 101b blocks the channel for steam and may cause malfunction. In the present invention, by providing the hard layer 2 and the deposited carbon film 3 on a portion of the base material 1 corresponding to scale S shown in FIG. 2, scale deposition can be effectively prevented.

Such a steam turbine member comprising the hard layer 2 and the deposited carbon film 3 on the base material 1 constitutes a steam turbine together with other members, and the steam turbine is used in power generation facilities, in particular, geothermal power plants. In an example, the steam turbine may have a bearing fixed to a base, a steam turbine rotor rotatably supported by the bearing and a casing covering the steam turbine rotor. A steam inlet for supplying steam from a geothermal steam well and a steam outlet are provided on the outer surface of the casing. In the casing, a plurality of rotor blades are arranged and fixed to the steam turbine rotor in the axial direction at predetermined intervals between the steam inlet and the steam outlet. Stationary blades corresponding to these rotor blades are fixed to the casing, and the stationary blades and the rotor blades are alternatingly arranged in the axial direction. The casing and the rotor may also have a seal fin arranged to face the tip of the rotor blade and the stationary blade in the axial direction, respectively. The member comprising the hard layer 2 and the deposited carbon film 3 according to the present invention may be used for one or more of such members constituting the steam turbine, and this can prevent breakdown and reduction in efficiency of power generation due to scale deposition.

Next the steam turbine member of the present invention will be described in terms of the method of production. The method for producing a steam turbine member according to the present invention includes the following steps:
  (1) forming a hard layer on a base material; and
  (2) forming a deposited amorphous carbon film on the hard layer.

The step of forming a deposited amorphous carbon film on the hard layer may have the following sub-steps.
  (i) supplying a high energy heat source to a carbon source in vacuum; and (ii) depositing a substance comprising carbon, which is generated in the step, on the base material, to form a deposited amorphous carbon film.

The method also comprises a step of supplying a hydrogen source and/or nitrogen source and depositing hydrogen and/or nitrogen on the base material together with carbon, in addition to the sub-steps (i), (ii).

When carrying out the method of production, a base material 1 processed into the shape of a predetermined turbine member is prepared. The type of metal of the base material is as described above. Before the Step 1 and Step 2, the method may include the step of mirror polishing the surface of the base material on which the hard layer 2 and the deposited carbon film 3 are formed.

Step (1) of forming a hard layer 2 on a base material 1 may be performed by a method suitable for the type of the ceramic compound constituting the hard layer 2. For example, a method usually used for forming a ceramic thin film, such as vacuum deposition, including chemical vapor deposition and physical vapor deposition, and thermal spraying, may be used, but this is not limited thereto. When a hard layer 2 is composed of a plurality of layers 2a and 2b of different compounds, each compound layer may be sequentially formed by a method suitable for the compound.

In an optional step, a Si thin film may be formed on the hard layer 2 after forming the hard layer 2 and before forming the deposited carbon film 3. This is to improve adhesion of the deposited carbon film 3. The Si thin film may be formed by a usual method such as vacuum deposition.

Step (2) for forming a deposited carbon film 3 comprises forming a deposited carbon film 3 on the hard layer 2 by a dry plating method after Step (1) for forming the hard layer 2 and may further comprise the sub-steps (i) and (ii). Examples of such methods include a chemical vapor deposition method (CVD) using a hydrocarbon gas as a carbon source and a physical vapor deposition method (PVD) using solid carbon as a carbon source. The steam turbine member of the present invention may be produced by either of these methods. Examples of chemical vapor deposition methods include plasma CVD, and examples of physical vapor deposition methods include deposition, ion plating, and sputtering, but these are not limited thereto.

A method of production using a chemical vapor deposition method, in particular, DC pulse plasma CVD, will be described as the first embodiment of the step for forming deposited carbon film 3. The plasma CVD method may be performed using an apparatus 10 comprising a means for introducing hydrocarbon gas, which is a carbon source, a means for applying DC pulse bias to a member on which film is to be formed, and a means for supporting a base material in a vacuum chamber. Methane, ethane, acetylene and the like may be used as a hydrocarbon gas, and a hydrocarbon gas fit for the purpose may be selected by those skilled in the art.

In the sub-step (i) of the DC pulse plasma CVD method, DC pulse bias with negative potential to the grounded film forming container is applied to the base material 1 to produce plasma around the base material 1 and the hard layer 2 formed thereon, and hydrocarbon gas, for example, methane, is introduced into the region in which plasma is produced. Then, methane is decomposed by the plasma and a deposited carbon film 3 containing hydrogen is formed on the hard layer 2 to perform Step 2. In the film forming, the content of hydrogen in the deposited carbon film 3 can be adjusted by controlling the degree of decomposition of methane by changing collision energy of methane decomposed by regulating the negative voltage applied to the base material 1. Specific conditions for achieving a predetermined content of hydrogen in the deposited carbon film 3 may be determined by those skilled in the art based on, for example, preliminary experimentation. In the plasma CVD method, a deposited carbon film 3 containing hydrogen may be produced by simultaneously supplying a carbon source and a hydrogen source thereto. The chemical vapor deposition method is not limited to the plasma CVD method, and a chemical vapor deposited carbon film 3 can also be produced by using another chemical vapor deposition method.

Chemical vapor deposition methods including plasma CVD are particularly advantageous for the production of a deposited carbon film 3 containing hydrogen. The methods also have the advantage that since hydrocarbon is used as a carbon source, a carbon-containing substance to be deposited in Step 2 easily spreads on some parts of the base material 1 and the hard layer 2 formed thereon, and thus, the deposited carbon film 3 can be easily formed on any parts.

Next, the second embodiment of the step for forming deposited carbon film 3 is a physical vapor deposition method. The physical vapor deposition method may be performed by using an apparatus comprising a target such as solid carbon, a means for producing a high energy heat source and a means for supporting a base material 1 in a vacuum chamber. In an arc ion plating method, which is an example of physical vapor deposition methods, vacuum arc discharge is generated between a cathode which is a target, i.e., a carbon source, and an anode to evaporate carbon particles from the surface of the target in sub-step (i). The carbon particles are positively charged by passing them through plasma, and in sub-step (ii), the positively charged carbon particles are deposited on the hard layer 2 formed on the base material 1 to which negative bias voltage has been applied to form a deposited carbon film 3. Furthermore, a physical vapor deposited film of carbon containing nitrogen may be formed by introduction of a nitrogen ion beam simultaneously with depositing particles on the hard layer 2 formed on the base material 1. By changing the amount of nitrogen gas introduced at that stage, the content of nitrogen in the deposited carbon film 3 can be controlled. By using hydrogen gas instead of nitrogen gas, a physical vapor deposited film of carbon containing hydrogen can also be formed in the same manner. The physical vapor deposition method is not limited to the arc ion plating method, and a physical vapor deposited film of carbon can also be produced by using another physical vapor deposition method. It is preferable that in the physical vapor deposition method, a means for movably supporting the base material 1 be provided depending on the shape and features of the base material 1 in order to deposit carbon particles that have greater difficulty in reaching the desired site than hydrocarbon gas.

The physical vapor deposition method is particularly advantageous for producing a deposited carbon film 3 containing nitrogen, and it is also used for producing a deposited carbon film 3 containing both nitrogen and hydrogen. In that case, such a film may be produced by using hydrogen gas as a hydrogen source and by introducing both nitrogen gas and hydrogen gas into the vacuum chamber. Other advantages of the physical vapor deposition method are that dangling bonds are less likely to occur and a deposited carbon film 3 having a desired composition can be produced.

The steam turbine member produced as described above, in which the hard layer 2 and the deposited carbon film 3 are formed on the desired portion of the base material 1, may be combined with other members to produce a steam turbine.

The method for producing a steam turbine member according to the present embodiment includes a method for repairing a steam turbine member in addition to a method for newly producing a steam turbine member. In that case, a steam turbine member may be repaired by polishing part of the surface of the base material, if necessary, and then forming a hard layer and a deposited carbon film on necessary portions in the same manner as in the method of production of the present embodiment.

EXAMPLES

Hereinafter the present invention will be described in more detail with reference to Examples, but the present invention is not limited thereto.

Example 1

A sample of a steam turbine blade having a hard layer and a deposited amorphous carbon film (DLC) on a base material was produced. A material composed of martensite stainless steel (SUS420J1) having a diameter of 22.5 mm and height of 4 mm and simulating the shape and the size of a first-stage stationary blade which suffers from severe adhesion of scale was prepared as a base material. A film of a single layer composed of WC was formed by thermal spraying as the hard layer. The hard layer after film forming had a film thickness of about 100 μm and a film hardness of about 3,000 Hv. A film containing about 25 atomic % of hydrogen was formed by vacuum deposition as a deposited carbon film. The deposited carbon film after film forming had a film thickness of about 2 μm and a film hardness of about 2,000 Hv.

Example 2

A sample of a steam turbine blade was produced in the same manner as in Example 1 except for forming a film of a single layer composed of CrN by PVD as the hard layer. The hard layer after film forming had a film thickness of about 1.5 μm and a film hardness of about 1,500 Hv. The deposited carbon film after film forming had a film thickness and a film hardness similar to those in Example 1.

Comparative Example 1

A sample of a steam turbine blade was produced in the same manner as in Example 1 except for forming a deposited carbon film directly on the base material without forming a hard layer. The deposited carbon film after film forming had a film thickness and a film hardness similar to those in Example 1.

Comparative Example 2

A sample of a steam turbine blade was produced by forming only a hard layer on a base material without stacking a deposited carbon film. A film of a single layer composed of TiAlN was formed by vacuum vapor deposition as the hard layer. The hard layer after film forming had a film thickness of about 5 μm and a film hardness of about 2,500 Hv.

Comparative Example 3

A sample of a steam turbine blade composed only of a base material without a hard layer or a deposited carbon film was produced as the sample of a steam turbine blade of Comparative Example 3.

The sample of a steam turbine blades of Examples 1 and 2 and Comparative Examples 1 to 3 were exposed to geothermal steam for 3 months, and adhesion of scale and peeling were investigated. More specifically, photographs of the respective samples of a steam turbine blade were taken and the condition of the surface was observed (not shown). As a result, scale adhered to the entire surface of the sample of a steam turbine blade of Comparative Example 3. In contrast, adhesion of scale was suppressed in all of the samples of a steam turbine blade of Examples 1 and 2 and Comparative Examples 1 and 2. However, in Comparative Examples 1 and 2, the silver color of the base material of the sample blade was visible, meaning that some portion of the deposited carbon film peeled off. Adhesion of scale was substantially not observed in the samples of a steam turbine blade of Examples 1 and 2. Furthermore, the condition of the surface of the samples of a steam turbine blade of Examples 1 and 2 was almost unchanged from that before exposure to geothermal steam, and the black appearance of the deposited carbon film was maintained, and both the hard layer and the deposited carbon film did not peel off nor were damaged, and remained on the surface of the base material. For the samples of a steam turbine blade of Examples 1 and 2, the hard layer and the deposited carbon film did not peel off for at least half a year, proving that the effect of suppressing scale was maintained.

As described above, we verified that the deposited carbon film significantly suppresses adhesion of scale and peeling of the deposited carbon film can be prevented by forming a hard layer under the deposited carbon film. A comparison between Examples 1 and 2 and Comparative Example 1 shows that although the outermost layer was coated with the same deposited carbon film, peeling resistance of the deposited carbon film varied depending on the presence of the hard layer immediately below the deposited carbon film. While not intended to be bound by theory, this is because since the outermost deposited carbon film was as thin as about 2 μm, compressive stress propagated through the deposited carbon film when an incoming solid collides with the surface of a blade, and the base material of the blade is deformed, and as a result, the deposited carbon film cannot follow the deformation of the base material, resulting in breakage and peeling of the deposited carbon film. The base material has a hardness only about ⅛ the hardness of the deposited carbon film, and it was easily deformed. In contrast, the hard layer provided under the deposited carbon film has high hardness and is capable of suppressing deformation, and thus, breakage and peeling of the deposited carbon film is prevented.

When steam includes a large amount of solid components such as corrosion products formed on the inner surfaces of pipes of a steam turbine facility and peels off therefrom, and rock components, a phenomenon of wear called solid particle erosion occurs, and this may result in formation of a large number of recesses with a diameter of about 100 μm on the surface of the turbine blade. The steam turbine of the present invention comprising a hard layer and a deposited amorphous carbon film can maintain the effect of suppressing adhesion of scale for a long time without breakage or peeling of the deposited carbon film even in such harsh wear conditions. The present Examples verified that a highly durable steam turbine member capable of suppressing adhesion of scale of silica, calcium, and iron sulfide for a long time can be produced.

REFERENCE SIGNS LIST

1 Base material, 2 Hard layer, 3 Deposited carbon film
101a, b First-stage stationary blade, 102 Rotor blade
100 Geothermal steam, S Scale
What is claimed is:
1. A steam turbine member comprising:
a base material comprising metal;
a first inorganic layer formed on the base material, the first inorganic layer comprising one or more inorganic compounds selected from WC, TiC, $SiO_2$, $Al_2O_3$, TiN, ZrN, CrN, TiCN, TiAlN, TiCrN, $ZrO_2$ and CoNiCrAlY;

a second inorganic layer formed on the first inorganic layer on a side opposite to the base material, the second inorganic layer comprising one or more inorganic compounds selected from WC, TiC, $SiO_2$, $Al_2O_3$, TiN, ZrN, CrN, TICN, TiAlN, TiCrN, $ZrO_2$ and CoNiCrAlY; and a deposited amorphous carbon film formed on the second inorganic layer on a side opposite to the first inorganic layer, wherein the second inorganic layer has a hardness greater than a hardness of the first inorganic layer, and the deposited carbon film has a maximum height roughness Rz of more than 1.0 μm and equal to or less than 6.3 μm.

2. The steam turbine member according to claim 1, wherein each of the first and second inorganic layers has a hardness of not less than 1,000 Hv.

3. The steam turbine member according to claim 1, wherein a total thickness of the first and second inorganic layers is 1 μm to 500 μm.

4. The steam turbine member according to claim 1, wherein the deposited carbon film has a relative intensity ratio (Id/Ig) between an intensity at a D band and an intensity at a G band in a Raman spectrum of 0 to 1.5.

5. The steam turbine member according to claim 1, wherein the deposited carbon film has a thickness of 100 nm to 8 μm.

6. The steam turbine member according to claim 1, wherein the steam turbine member is a first-stage stationary blade.

7. A steam turbine comprising the steam turbine member according to claim 1.

\* \* \* \* \*

UNITED STATES PATENT AND TRADEMARK OFFICE
CERTIFICATE OF CORRECTION

PATENT NO. : 12,442,307 B2  
APPLICATION NO. : 17/972736  
DATED : October 14, 2025  
INVENTOR(S) : Yuya Nakashima et al.

Page 1 of 1

It is certified that error appears in the above-identified patent and that said Letters Patent is hereby corrected as shown below:

In the Claims

Column 11, Line 5:
In Claim 1, delete "TICN," and insert -- TiCN, --.

Signed and Sealed this  
Ninth Day of December, 2025

John A. Squires  
*Director of the United States Patent and Trademark Office*